(12) United States Patent
Van Dyk et al.

(10) Patent No.: US 7,188,883 B2
(45) Date of Patent: Mar. 13, 2007

(54) COLLAPSIBLE SEAT ASSEMBLY

(75) Inventors: Sino J. Van Dyk, Plymouth, MI (US); Jon Nichols, Northville, MI (US); Thomas Fritz, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 10/905,514

(22) Filed: Jan. 7, 2005

(65) Prior Publication Data

US 2006/0152030 A1   Jul. 13, 2006

(51) Int. Cl.
*B60N 2/02* (2006.01)
(52) U.S. Cl. .............................. 296/65.01; 296/65.09; 297/94; 297/95; 297/110; 297/115
(58) Field of Classification Search ............ 296/65.01, 296/65.06, 65.09, 65.16; 297/94, 95, 110, 297/116
See application file for complete search history.

(56) References Cited

U.S. PATENT DOCUMENTS

| | | | |
|---|---|---|---|
| 4,227,736 A * | 10/1980 | Lebault et al. ........... | 296/65.09 |
| 6,000,742 A | 12/1999 | Schaefer et al. | |
| 6,129,404 A | 10/2000 | Mattarella et al. | |
| 6,568,756 B2 * | 5/2003 | Sugimoto et al. ......... | 296/65.01 |
| 6,598,926 B1 * | 7/2003 | Price et al. .............. | 296/65.09 |
| 6,666,512 B1 * | 12/2003 | Timon ..................... | 296/65.09 |
| 6,702,355 B1 * | 3/2004 | Price et al. .............. | 296/65.09 |
| 6,997,500 B2 * | 2/2006 | Horsford et al. ......... | 296/65.09 |
| 2004/0100113 A1 * | 5/2004 | Katz et al. ............... | 296/65.09 |

OTHER PUBLICATIONS http://www.chrysler.com/town_country/features/interior_styling/index.html, chrysler—Town & Country—Interior Features—Space & Storage, 1 page.
http://www.chrysler.com/town_country/features/exterior_photos/index.html, Chrysler—Town & Country—Photo Gallery, 3 pages.

* cited by examiner

*Primary Examiner*—Lori L. Coletta
(74) *Attorney, Agent, or Firm*—Frank A. MacKenzie; Brooks Kushman P.C.

(57) ABSTRACT

A multi-positional collapsible seat assembly for a motor vehicle is disclosed. The seat assembly includes a seat bottom having a load surface provided on an underside thereof and a seat back having a load surface provided on the back side thereof. As the seat assembly is collapsed, the seat bottom is pivoted forward and the seat back is pivoted adjacent to the seat bottom such that the load surfaces collectively provide a load floor for receipt of cargo. An armrest assembly is disclosed that facilitates both passenger and cargo transport. A method is also disclosed for collapsing the seat assembly.

19 Claims, 16 Drawing Sheets

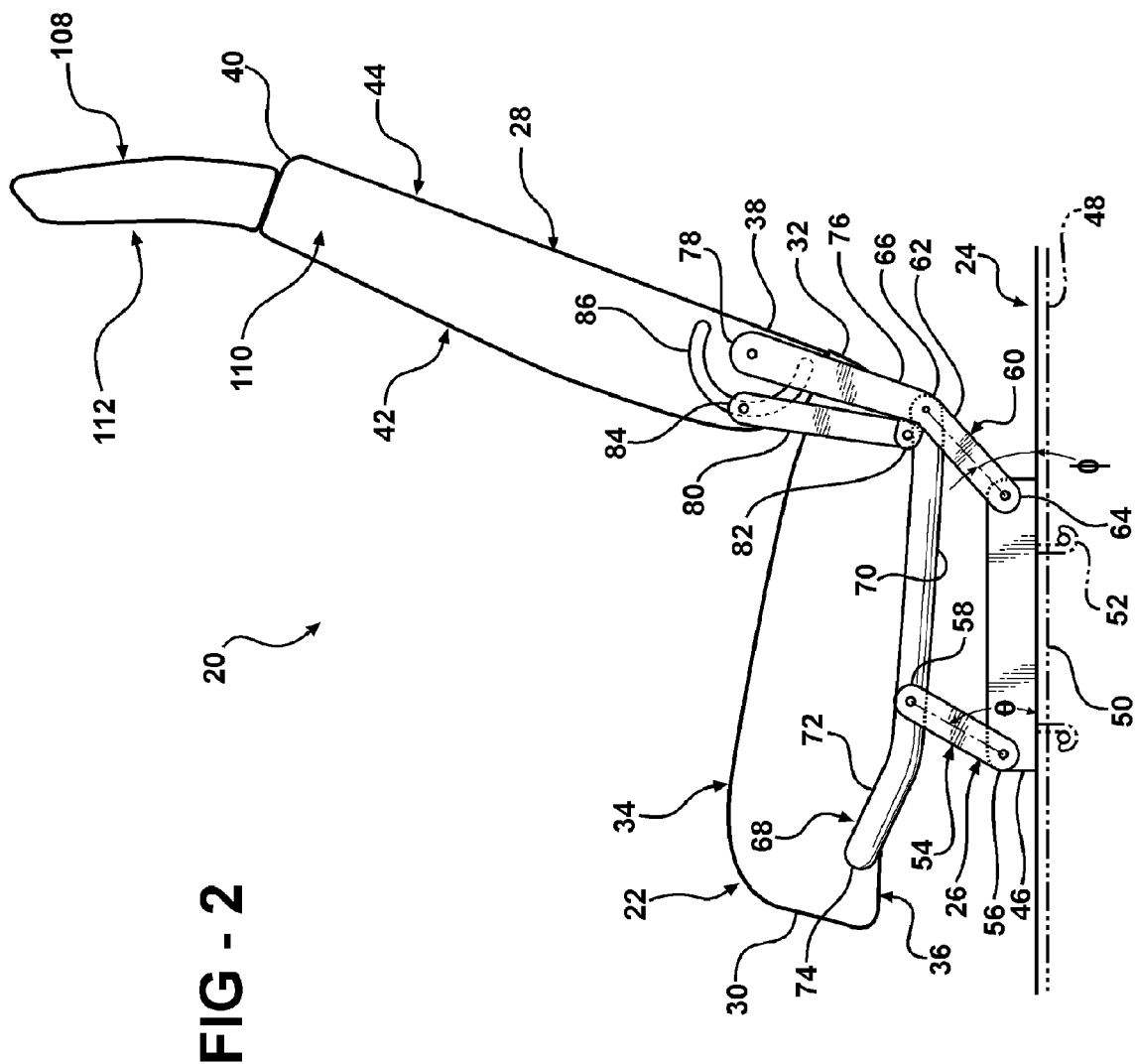

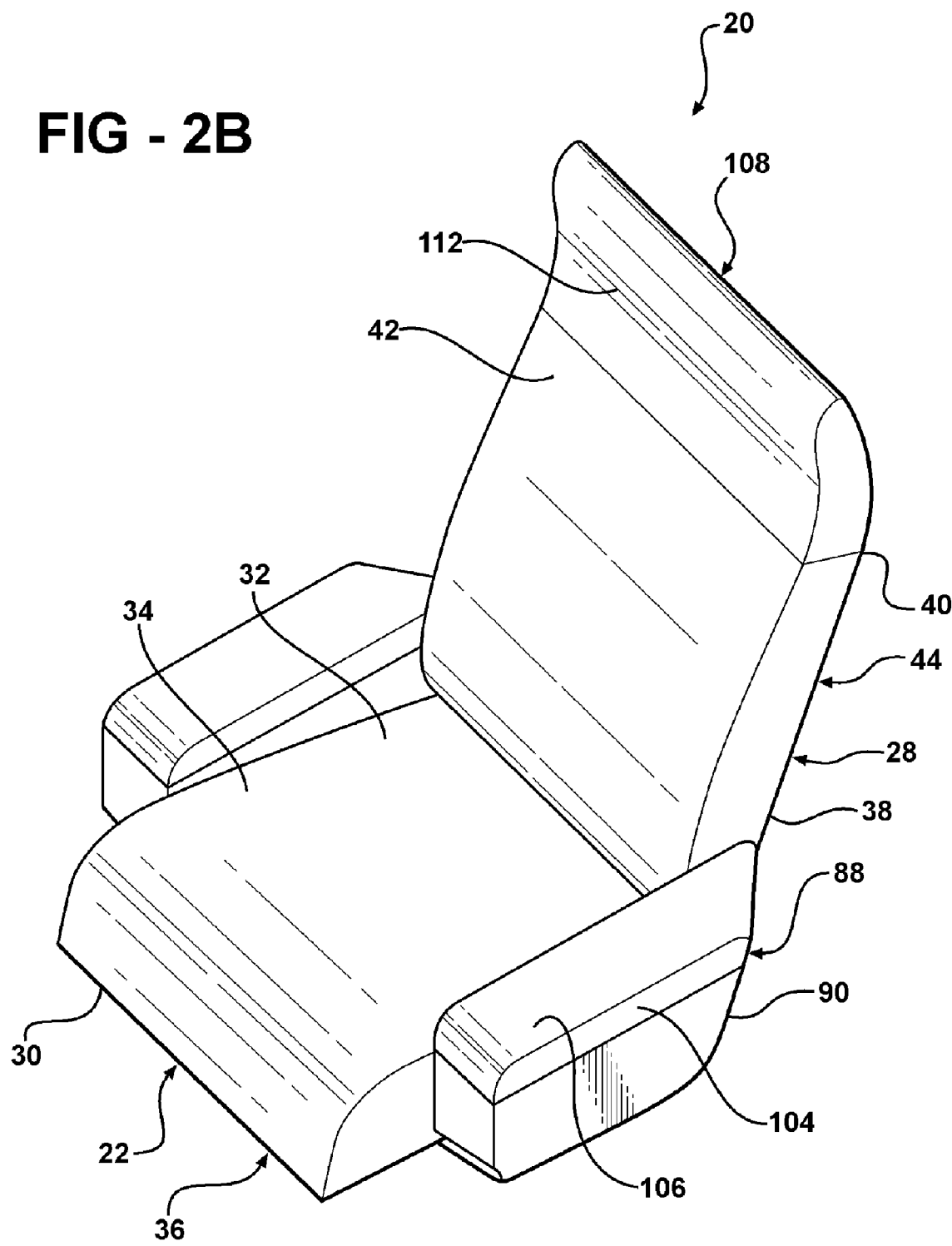

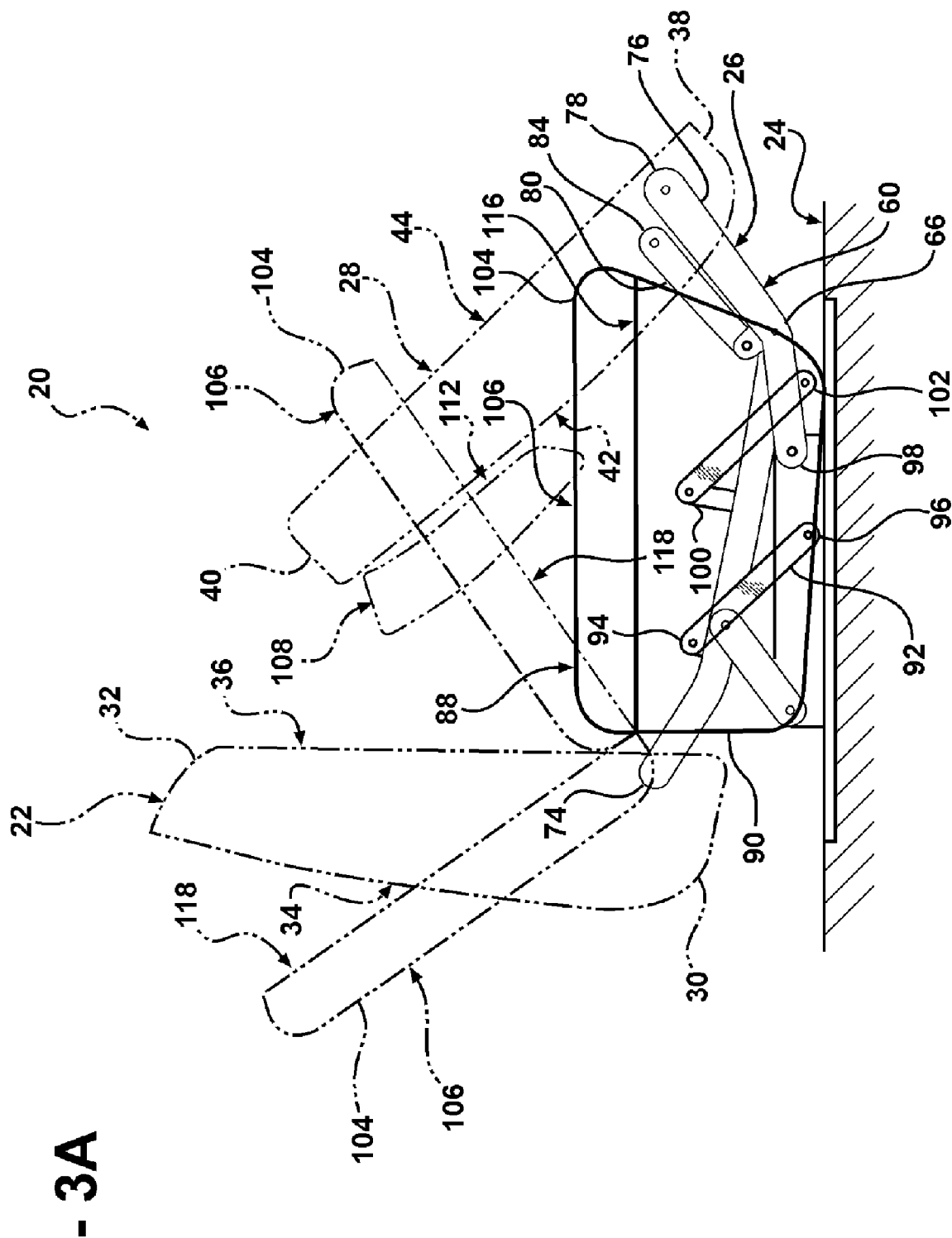

COLLAPSIBLE SEAT ASSEMBLY

BACKGROUND OF THE INVENTION

1. Field of the Invention

The present invention relates generally to seat assemblies, and more specifically, to collapsible seat assemblies.

2. Background Art

Passenger vehicles having multiple rows of seats have been popular for many years. Vehicles that are capable of hauling cargo have also been popular for many years due to their utility. Passenger vehicles are continuously evolving to be utilized for hauling cargo as well.

For example, the prior art has provided sedans, which have at least two rows of seats for seating two rows of passengers. Sedans have been provided with rear bench seats having a foldable seat back for extending the cargo-carrying capacity of the trunk into the passenger compartment of the automobile. Such cargo-carrying capacity is limited by the trunk dimensions.

Another offering of the prior art includes station wagons having two or three rows of seats. The third row of seats may be provided rearward of the rear axle and the third row of seats may be recessed lower than the second row of seats without interfering with the drivetrain to enhance cargo-carrying capacity of this region. In station wagons, when the third row is folded, a load floor is provided upon the third row of seats.

Another offering of the prior art includes sport utility vehicles, which are often referred to as SUVs. SUVs may also include two or three rows of seats, wherein the second or third row of seats may be removed. Other offerings include seats or seat rows that may be collapsed. Since many SUVs utilize rear wheel drive, four wheel drive, or all wheel drive, clearance must be provided beneath the floor plan for the drivetrain from the vehicle's engine to extend to the rear wheels.

Accordingly, the prior art discloses SUVs having a third row of seats wherein the third row seat bottom detaches from the seat back and is translated to the floor adjacent the second row of seats. The third row becomes completely collapsed by pivoting the third row seat back forward to a collapsed position atop the seat bottom. Such disclosures also utilize a collapsible second row of seats for providing cargo space. The second row of seats often includes a seat back that pivots toward a seat bottom in a collapsed orientation. The collapsed second and third rows often provide a load floor upon the rear surfaces of the second and third seat backs.

These collapsible seat assemblies often require load floor flaps for covering gaps provided between sequential seat assemblies.

A further offering of such prior art SUV seat assemblies is a second row of seats that collapse and pivot toward the first row for permitting ingress and egress of passengers through a second row of doors and to-and-from the third row of seats.

Accordingly, these prior art SUV seating arrangements provide clearance between the second row of seats and the first row of seats in the collapsed orientation such that the second row of seats may temporarily occupy the clearance for access to the third row of seats.

Another offering of the prior art includes vans and minivans, which commonly utilize a generally planar floor plan that does not require various floor plan elevations as do sedans, station wagons, and SUV's. Vans and minivans have been provided with multiple rows of seats wherein seat assemblies may be mounted to tracks formed within the floor. The seats may be adjusted lengthwise within the vehicle and may also be extracted from the vehicle for providing cargo space. However, removal of seat assemblies may be burdensome to the average consumer and may lack convenience by temporarily limiting the passenger capacity of the given vehicle.

Accordingly, the prior art has offered vans or minivans having seat assemblies that collapse and are stored within storage compartments displaced below the floor of the vehicle interior. Such prior art vehicles provide vast capacity for transporting cargo. The trade-offs, however, include limits imposed upon the vehicle drivetrain. For example, by providing a compartment beneath a second row of seats, the given vehicle may be limited from utilization of rear wheel drive, four wheel drive, or all wheel drive by lacking clearance for drivetrain components such as a driveshaft to extend from a front-mounted engine to the rear wheels of the vehicle.

The prior art has offered seat assemblies having armrests for enhancing the comfort of passengers therein. Armrests are often pivotally mounted to a given seat assembly for permitting ingress or egress into the corresponding seat. However, armrests may add to the complexity of the seat assembly and often include advantages for seating of passengers, but fail to enhance transportation of cargo.

In light of the foregoing, what is needed is a collapsible seat assembly for a vehicle that satisfies transportation of a passenger or cargo. What is also needed is an armrest assembly that benefits transportation of the passenger or cargo. Further, a method for collapsing a seat assembly in a motor vehicle is needed.

SUMMARY OF THE INVENTION

An aspect of the present invention is to provide a seat assembly having a seating position and a collapsed position. The seat assembly includes a seat bottom having a seating surface and a load surface. The seat assembly includes a seat back having a back supporting surface and a load surface. The seat assembly is collapsed such that the seat bottom load surface and the seat back load surface collectively provide a load floor for supporting and receiving cargo thereon. The collapsible seat assembly includes a linkage assembly for facilitating various positions in the seat assembly.

A further aspect of the present invention is to provide a seat bottom having a load surface provided on the underside thereof wherein the seat bottom is pivoted to an orientation exposing the load surface in the collapsed position.

Another aspect of the present invention is to provide a load surface on a rear side of the seat back, and the seat back lies flat and adjacent to the seat bottom in the collapsed position.

Yet another aspect of the present invention is to provide a collapsible seat assembly that may tilt forward for providing access rearward of the seat assembly.

Yet still another aspect of the present invention is to provide a collapsible seat assembly that may recline in the seating position for facilitating passenger comfort.

Yet another aspect of the present invention is to provide an armrest assembly that supports an arm portion of a passenger in a seating position and provides a portion of a load floor in a collapsed position.

A further aspect of the present invention is to provide an armrest assembly that is translatable relative to a seat assembly for permitting ingress and egress to the seat assembly.

The above aspects, and other aspects, objects, features, advantages, and benefits of the present invention are readily apparent from the detailed description of embodiments of the present invention when taken in connection with the accompanying drawings.

BRIEF DESCRIPTION OF THE DRAWINGS

FIG. 2 is a left side elevation view of a seat assembly in accordance with the teachings of the present invention, illustrated in a seating position;

FIG. 2b is a perspective view of the seat assembly and armrest assembly of FIG. 2a, illustrated in a seating position;

FIG. 3a is a left side elevation view of the seat assembly and armrest assembly of FIG. 2a, illustrated in a partially collapsed position;

DETAILED DESCRIPTION OF EMBODIMENTS OF THE INVENTION

Figure 1:
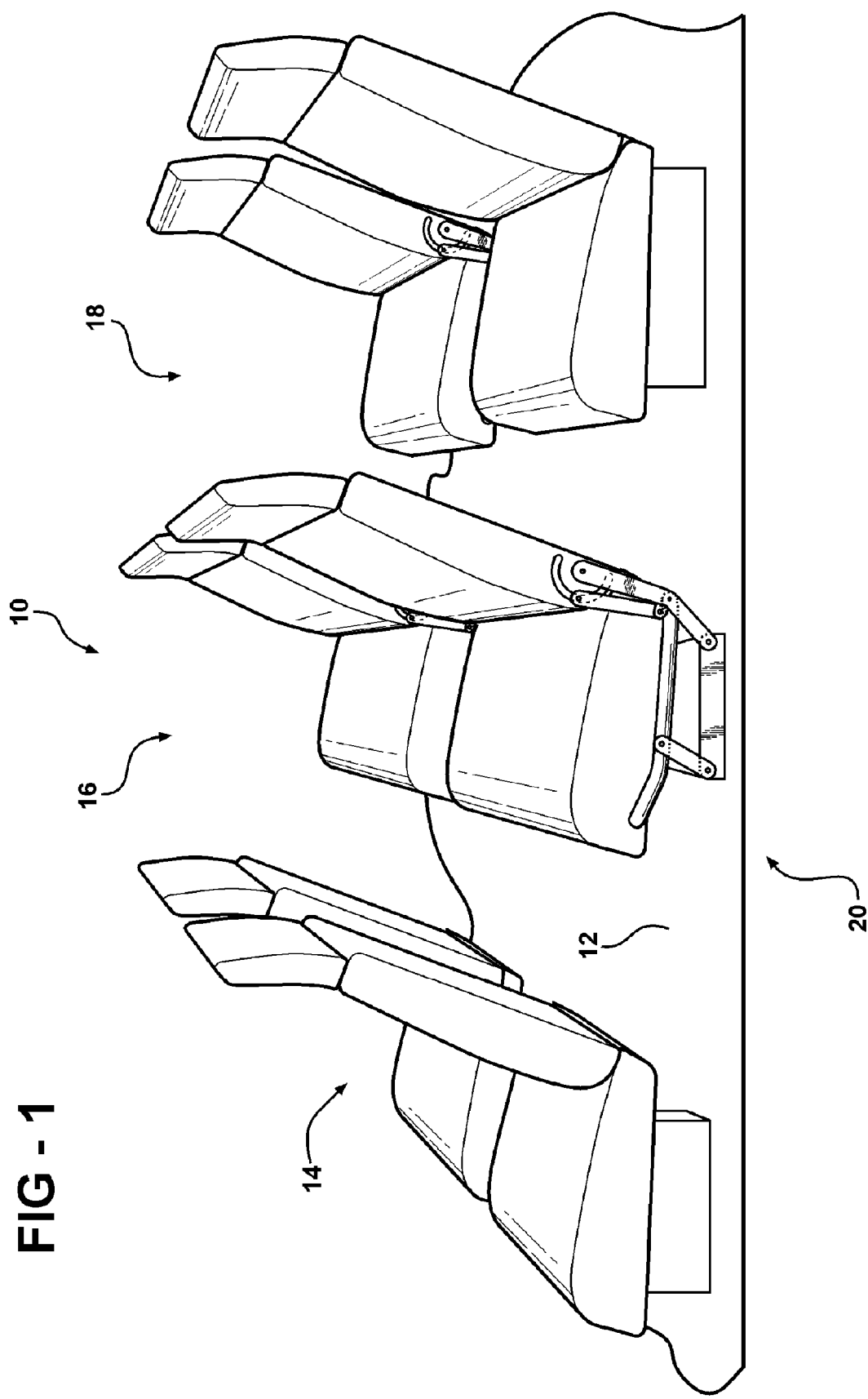
FIG. 1 is a left side perspective view of an automotive interior having a seat assembly in accordance with the teachings of the present invention, illustrated in a seating position.

Referring to FIG. 1, an automotive interior environment is partially illustrated. The environment is within a motor vehicle 10 such as a minivan. The minivan is illustrated having a generally planar floor plan 12. Of course, the invention contemplates utilization of the present invention with uneven floor plans, which are often provided in SUV's or other multiple row vehicles.

The vehicle 10 includes three rows of passenger seats, namely a front row 14, a second row 16 and a third row 18. The first row 14 is provided with a pair of vehicle doors (not shown). For the vehicle 10 illustrated, the second row 16 is provided with at least one vehicle door (not shown). The vehicle also includes a rear access or door such as a liftgate. Referring specifically to the second row 16, a seat assembly 20 is illustrated in accordance with the present invention.

Referring now to FIG. 2, an exemplary embodiment seat assembly is illustrated and referenced generally by numeral 20. The seat assembly 20 includes a seat bottom 22 mounted to a motor vehicle floor 24 via a linkage assembly 26. The seat assembly 20 also includes a seat back 28, which is also mounted to the vehicle floor 24 by, for example, the linkage assembly 26.

The seat bottom 22 is illustrated having a front portion 30 and a rear portion 32. A top surface of the seat bottom 22 provides a seating surface 34 which may be cushioned, as is known in the art of seat assemblies. The seat bottom 22 is provided for comfortably supporting a seat portion of a passenger in a seating position of the seat assembly 20, such as the seating position illustrated in FIG. 2.

The seat bottom 22 is also provided with a load surface 36 displaced upon its underside. The load surface 36 is adapted for receiving and supporting cargo thereon in a collapsed position of the seat assembly 20.

The seat back 28 includes a lower portion 38 and an upper portion 40. The seat back lower portion 38 is oriented proximate to the seat bottom rear portion 32 and the seat back upper portion 40 extends generally upward therefrom. The seat back 28 includes a cushioned back support surface 42, which, as illustrated in FIG. 2, faces a forward direction relative to the seat bottom 22. The back support surface 42 engages and comfortably supports a back portion of the passenger when the passenger is received by the seat assembly 20 in the seating position. The seat back 28 also includes a load surface 44 provided on a rear side of the seat back 42. The seat back load surface 44 is adapted for receiving and supporting cargo in the collapsed position of the seat assembly 20.

The seat assembly 20 may include a seat bottom 22 and a seat back 28 sized to receive an individual passenger thereon. Alternatively, the seat assembly 20 may be a bench seat having a seat bottom 22 and a seat back 28 sized to receive a plurality of passengers or passengers thereon. Even further, the seat assembly 20 may be a partial bench seat, such as a portion of a 60/40 bench seat split, which is sized to receive one or more passengers thereon.

The seat assembly 20 is illustrated with the linkage assembly 26 provided on the left side of the seat assembly 20. The seat assembly 20 also includes another linkage assembly common to and corresponding with the linkage assembly 26 that is provided on the right side of the seat assembly 20 for uniform support thereacross and for facilitating the various positions of the seat assembly 20.

The linkage assembly 26 includes a mounting bracket 46 for mounting the seat assembly 20 to the vehicle floor 24. The mounting bracket 46 could be affixed to the vehicle floor 24 via conventional fasteners. Alternatively, a track 48 may be formed in the vehicle floor 24 for receiving a guide 50 and a latching mechanism 52 of the mounting bracket 46.

The linkage assembly 26 includes a forward link 54 having a first end 56 pivotally connected to the mounting bracket 46 and a second end 58 extending therefrom. A rearward link 60 may be provided in the linkage assembly 26 having a first leg 62 with a first end 64 pivotally connected to the mounting bracket 46 and a second end 66 spaced therefrom.

The linkage assembly 26 also includes a rocker link 68 having a first leg 70 that is pivotally connected to the forward link second end 58 and the second end 66 of the rearward link first leg 62. The mounting bracket 46, forward link 54, rocker link first leg 70 and rearward link first leg 62 collectively provide a four-bar linkage as illustrated in FIG. 2. Of course, any linkage is contemplated within the spirit and scope of the present invention.

The linkage assembly 26 may include cross-supports provided therebetween extending to a laterally-opposed linkage assembly. For example, cross-supports may be provided between the rocker link 68 with a corresponding rocker link and may be provided at pivot points 58 and 66. These cross-supports may also support the seat bottom 22 thereupon.

The rocker link 68 may further include a second leg 72 having a first end at the forward link second end 58 and a second end 74 extending forward of the forward link 54 toward the seat bottom front portion 30. The seat bottom 22 is connected to and supported by the rocker link 68 in the seating position of FIG. 2. Further, the seat bottom 22 may pivot about the second end 74 of the rocker link second leg 72 for collapsing the seat bottom 22.

The linkage assembly 26 may also include a rearward link second leg 76 having a first end at the second end 66 of the rearward link first leg 62, and a second end 78 extending upwardly therefrom. The seat back lower portion 38 is pivotally connected to the rearward link 60 at the second end 78 of the rearward link second leg 76. A latch mechanism (not shown) may be mounted to the seat assembly 20 for latching and unlatching the seat back 28 for permitting angular adjustment of the seat back 28 relative to the vehicle floor 24.

For additional support, an intermediate link 80 may be provided having a first end 82 pivotally connected to the rocker link 68 and a second end 84 connected to the seat back 28 in an orientation radially offset from the second end 78 of the rearward link second leg 76. The intermediate link second end 84 is illustrated connected to the seat back 28 within a radial slot 86, which maintains the connection with the intermediate link second end through various angular orientations of the seat back 28.

Figure 2A:
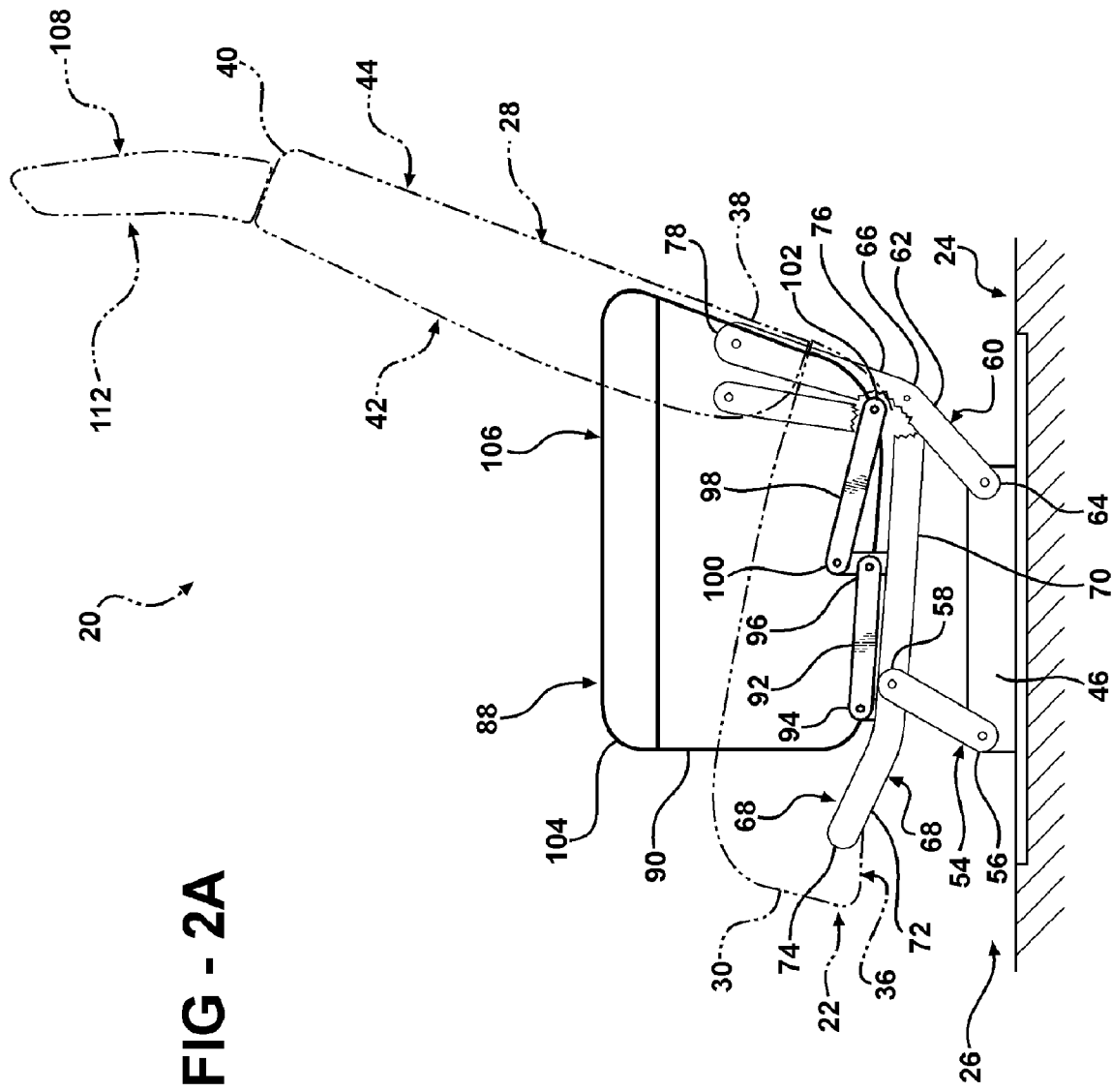
FIG. 2a is a side elevation view of the seat assembly of FIG. 2 and an armrest assembly, illustrated in a seating position.

Referring now to FIGS. 2a and 2b, the seat assembly 20 may also include an armrest assembly 88. The armrest assembly 88 provides a support for a passenger's arm in the seating position of the seat assembly 20, and also facilitates cargo transport. The armrest assembly 88 includes an armrest housing 90 that is mounted to the rocker link 68 and is positionable relative thereto. Specifically, the armrest assembly 88 includes a first link 92 having a first end 94 pivotally connected to the rocker link 68. The armrest first link 92 also includes a second end 96, which is pivotally connected to the armrest housing 90. Additionally, the armrest assembly 88 includes a second link 98 having first end 100 pivotally connected to the rocker link 68 and a second end 102 pivotally connected to the armrest housing 90.

The armrest housing 90 is translatable relative to the rocker link 68 at various positions provided by a four-bar linkage, which includes the rocker link 68, the armrest first link 92, the armrest housing 90, and the armrest second link 98. The pivotal connections of this linkage may each include a spring biased detent mechanism for temporarily locking the armrest assembly 88 in a given orientation. Alternatively, a latch mechanism may be mounted thereto for locking and unlocking the armrest assembly 88 and for positioning the armrest housing 90 relative to the rocker link 68.

The armrest assembly 88 includes an armrest cover 104 displaced atop the armrest housing 90. The armrest cover 104 may be cushioned and includes an arm supporting surface 106 provided on a top side thereof for receiving an arm portion of a passenger thereon. The armrest housing 90 may include storage therein, and the armrest cover 104 may permit access within the armrest housing 90.

Figure 2C:
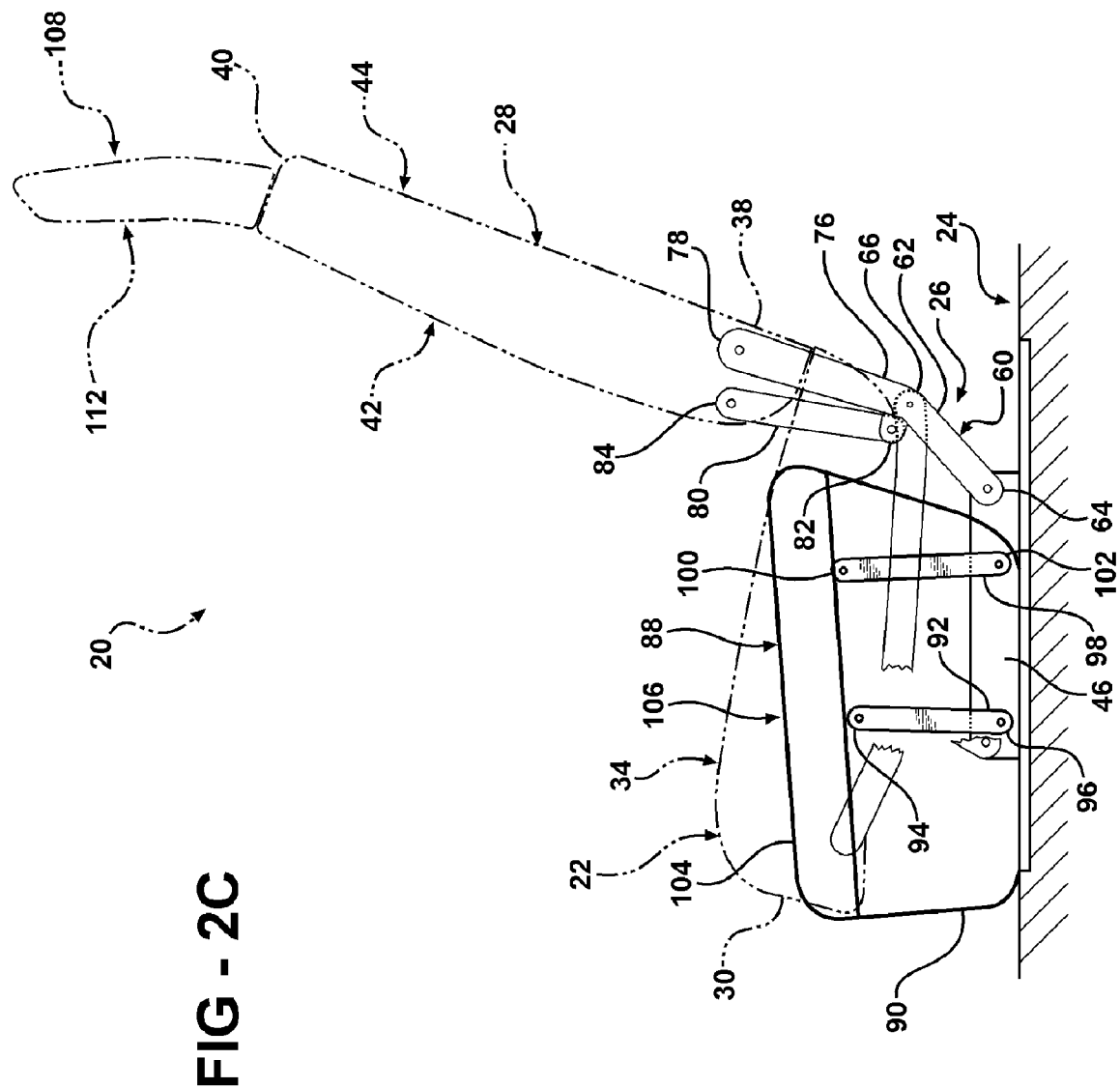
FIG. 2c is a left side elevation view of the seat assembly and the armrest assembly of FIG. 2a, illustrated in an ingress/egress position.
Figure 2D:
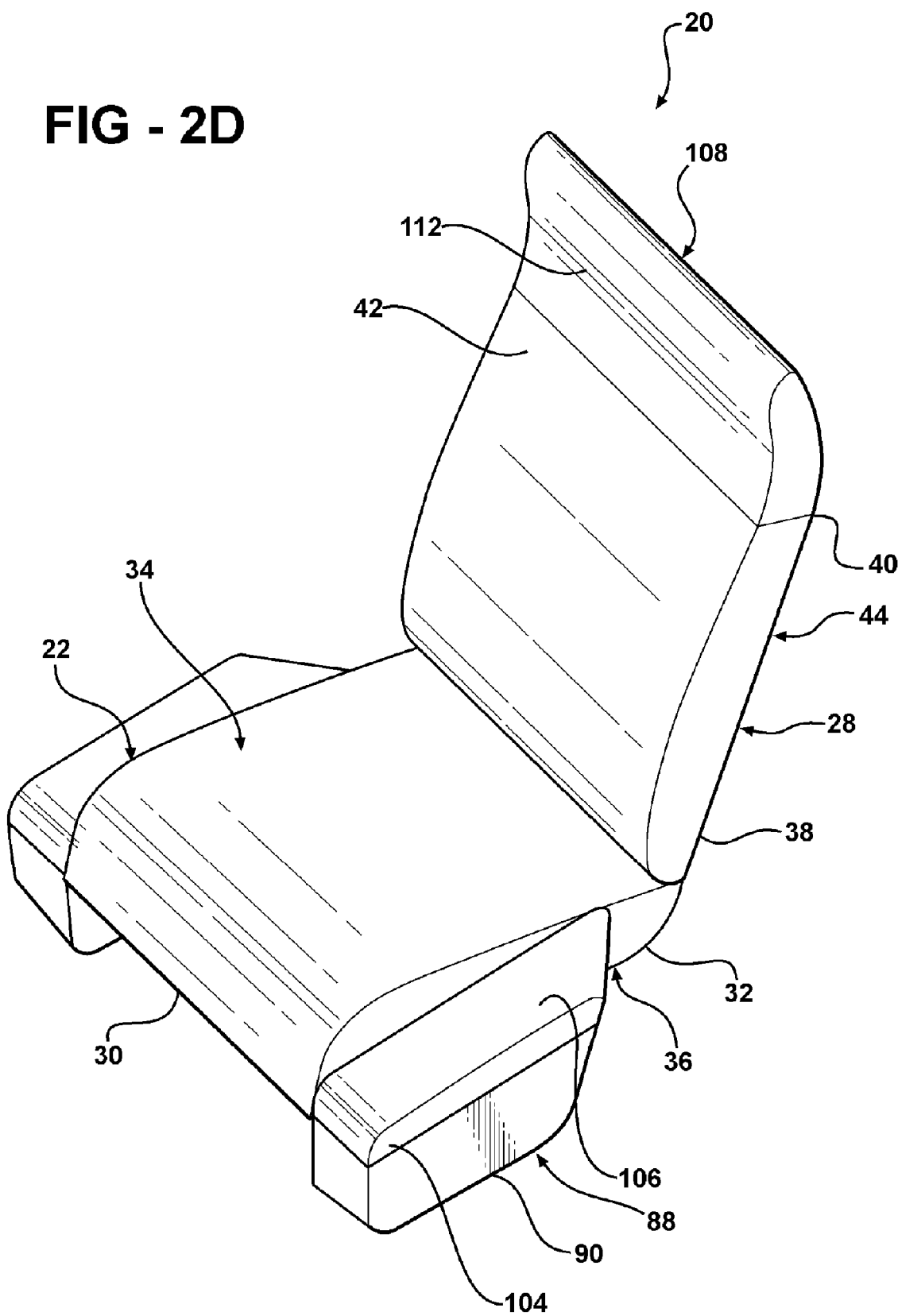
FIG. 2d is a perspective view of the seat assembly and the armrest assembly of FIG. 2a, illustrated in an ingress/egress position.

With reference now to FIGS. 2c and 2d, the armrest assembly 88 is illustrated at another orientation relative to the rocker link 68 such that the armrest cover 104 is disposed at an elevation beneath the seat bottom seating surface 34. In this orientation, the armrest assembly 88 permits passenger access to the seat assembly 20. Thus, the seat assembly 20 and armrest assembly 88 are illustrated in an ingress/egress position for permitting ingress and egress of the passenger to the seat assembly.

Figure 3:
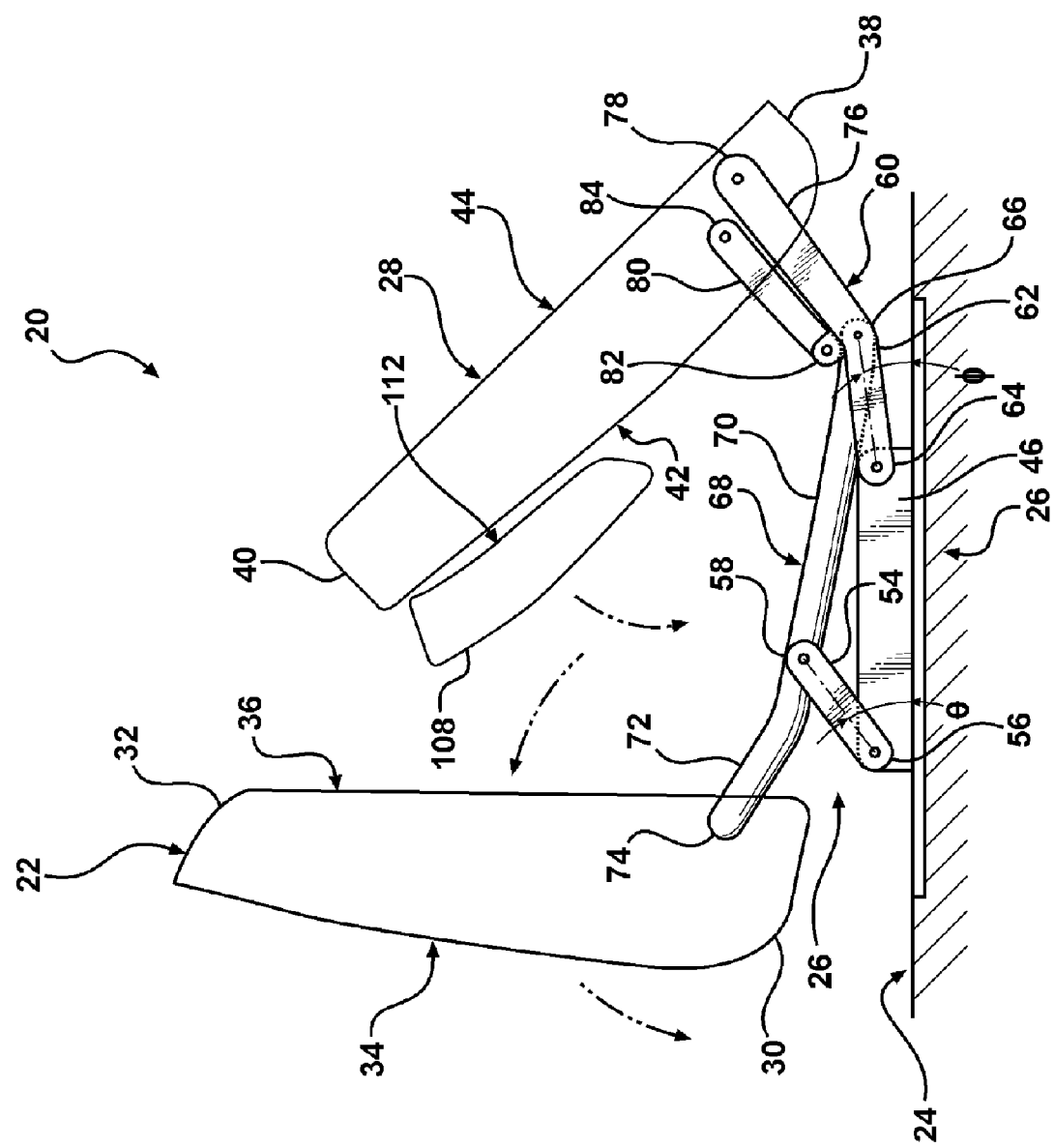
FIG. 3 is a left side elevation view of the seat assembly of FIG. 2, illustrated in a partially collapsed position.

With reference now to FIG. 3, the seat assembly 20 is illustrated in a partially collapsed orientation thereof. As the seat assembly 20 is collapsed, the linkage assembly 26 is collapsed as well such that the rocker link 68 is translated downward toward the vehicle floor 24. Referring back to FIG. 2, each of the forward and rearward links 54, 60 define an included angle θ, φ, respectively with the vehicle floor 24. Referring again to FIG. 3, these included angles, θ, φ, are decreased as the linkage assembly 26 collapses.

The seat assembly 20 is illustrated in a partially collapsed position in FIG. 3. The seat bottom 22 is illustrated pivoted about the second end 74 of the rocker link second leg 72. The seat assembly 20 may include a latch mechanism for latching the seat bottom 22 in the seating position. Accordingly, the latch mechanism may require actuation prior to pivoting the seat bottom 22.

As the seat bottom 22 is pivoted away from the collapsed linkage mechanism 26, clearance is provided for the seat back 28 to collapse as well. Referring back to FIG. 2, the seat assembly 20 includes a head rest 108 mounted to the seat back upper portion 40 and pivotally connected at pivot point 110. The headrest 108 includes a cushioned head supporting surface 112 for comfortably supporting a head of a passenger thereagainst.

Referring again to FIG. 3, the headrest 108 pivots so that the head support surface 112 faces the back support surface 42 as the seat back 28 is collapsed.

Referring now to FIG. 3a, as the seat assembly 20 is being collapsed, the armrest assembly 88 is being collapsed as well. The armrest assembly 88 is translated to an orientation wherein the underside of the armrest housing 90 engages the vehicle floor 24 and is supported thereupon. The armrest cover 104 is pivotally connected to the armrest housing 90 and is unlatched therefrom and pivoted away from the armrest housing 90.

Figure 4:
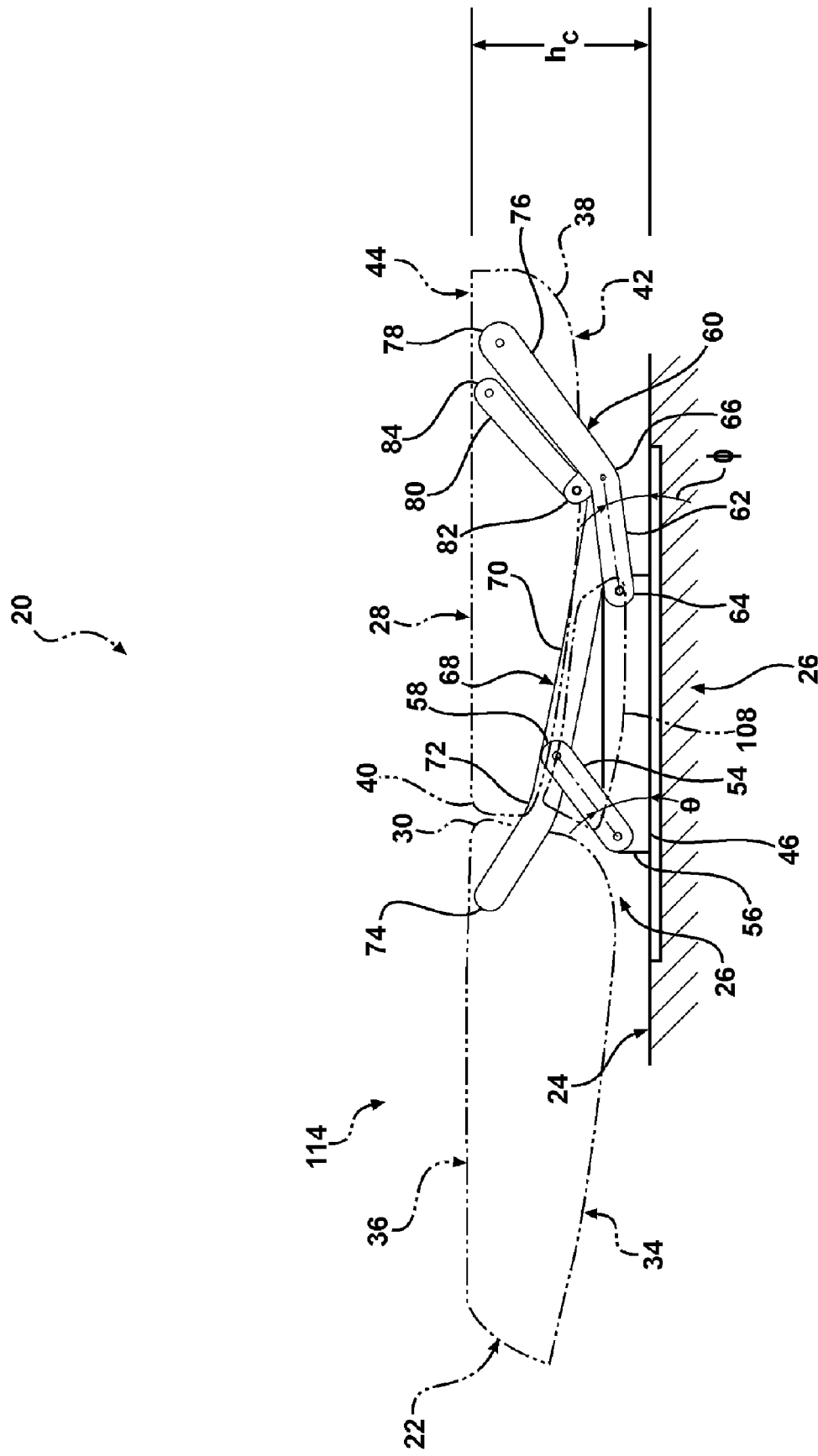
FIG. 4 is a left side elevation view of the seat assembly of FIG. 2, illustrated in a collapsed position.

Referring now to FIG. 4, the seat assembly 20 is illustrated fully collapsed. The seat bottom 22 reaches a radial limit in its range of rotation such that the load surface 36 is oriented generally parallel with the vehicle floor 24. The seat back 28 is illustrated fully collapsed to an orientation wherein the seat back upper portion 40 is displaced adjacent to the seat bottom front portion 30. The seat back load surface 44 is oriented generally planar with the seat bottom load surface 36 to collectively provide a load floor 114 for receiving and supporting cargo thereon. The load surfaces 36, 44 of the seat bottom 22 and seat back 28 may be provided with a high strength fabric, such as a fabric often provided on vehicle flooring or vehicle cargo areas for resisting the wear and tear associated with transporting cargo. Alternatively, the load surfaces 36, 44 of the seat bottom 22 and seat back 28 may be provided with a polymeric material, such as ABS plastic or a wooden or faux wooden material. Alternatively, a urethane coated stainless steel cover may be provided upon each load surface 36, 44 for resisting wear and tear thereon.

The seat assembly 20 collapses the seat bottom 22 and seat back 28 adjacent one another rather than in a stacked collapsed manner, such as prior art collapsible seat assemblies. The collapsed seat assembly 20 has an overall collapsed height $h_c$ that is much less than the prior art stacked assemblies. Additionally, the load floor 114 is extended forward from the seat assembly 20 toward a forward structure within the vehicle, such as another seat assembly. Thus, the seat assembly 20 may be aligned lengthwise in the vehicle with another seat assembly 20 for providing the common load floor 114 thereacross.

Figure 4A:
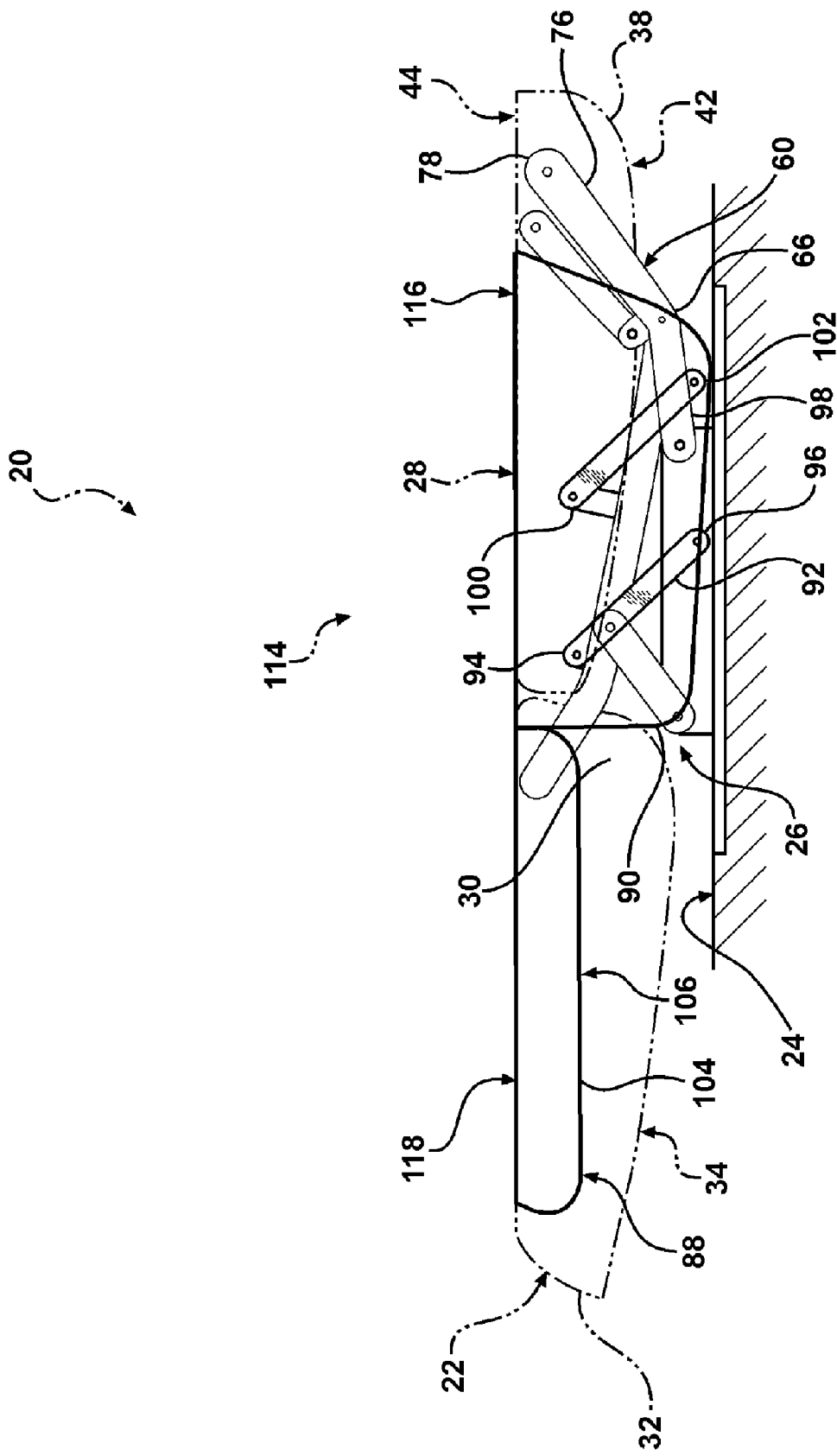
FIG. 4a is a left side elevation view of the seat assembly and the armrest assembly of FIG. 2a, illustrated in a collapsed position.
Figure 4B:
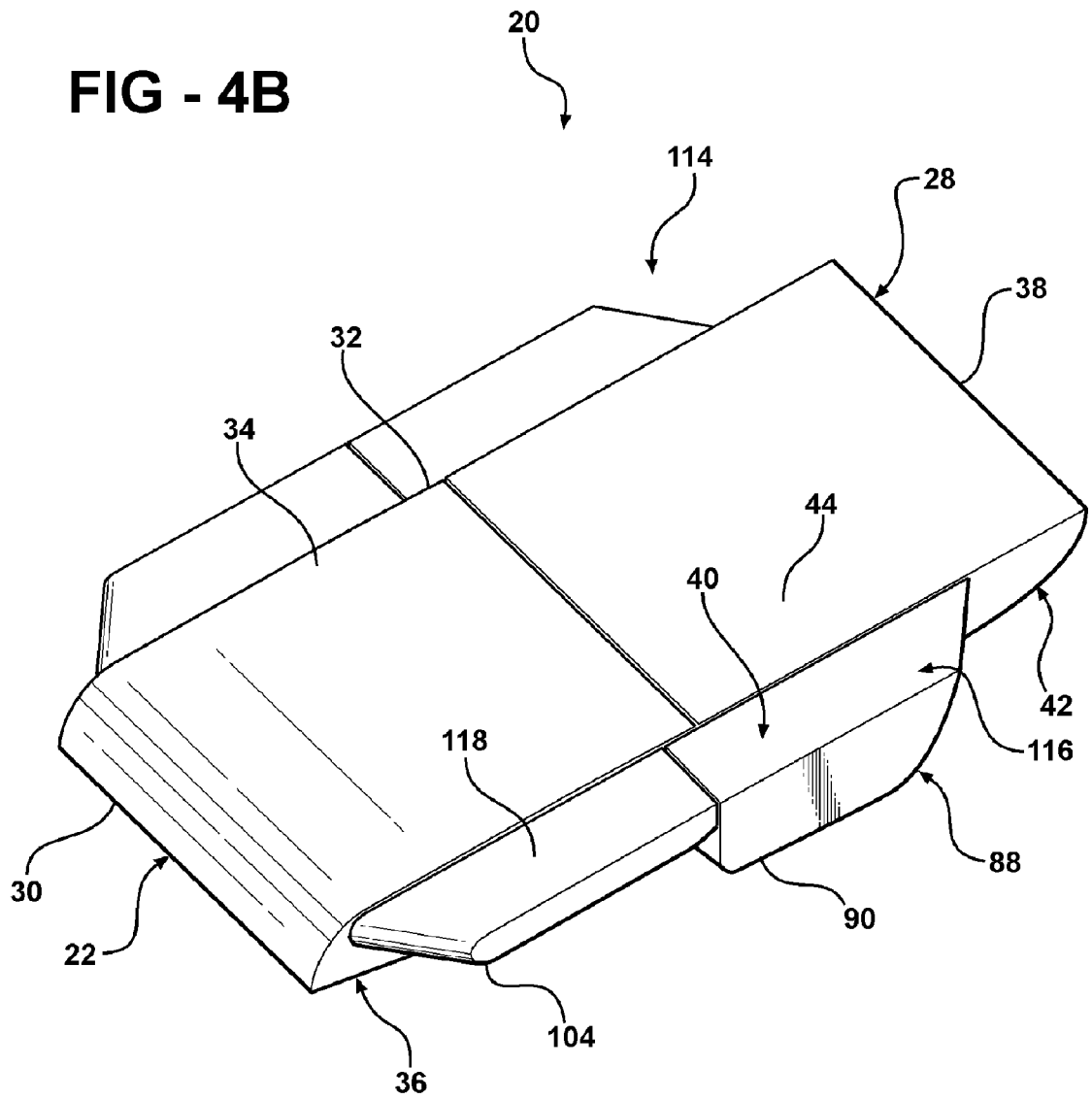
FIG. 4b is a perspective view of the seat assembly and the armrest assembly of FIG. 2a, illustrated in a collapsed position.

With reference now to FIGS. 4a and 4b, the armrest assembly 88 is illustrated fully collapsed. The armrest housing 90 includes a load surface 116 across the top surface thereof. Additionally, the armrest cover 104 includes a load surface 118 provided upon an underside thereof. The armrest load surfaces 116, 118 are aligned generally coplanar with the load surfaces 36, 44 of the seat bottom 22 and seat back 28 in the collapsed position. Thus, the load surfaces 116, 118 of the armrest assembly 88 also provide a portion of the load floor 114. The armrest load surfaces 116, 118 may be formed of common materials as that of the load surfaces 36, 44 of the seat bottom 22 and seat back 28.

In the collapsed orientation of the seat assembly 20, the seat bottom 22 is displaced into a leg region provided between the seat assembly 20 and a sequential seat assembly. Prior art collapsible seats commonly utilize this region for receiving the seat assembly once it has been collapsed and tilted forward for permitting ingress and egress of passengers into a rearward seat assembly provided thereby.

Figure 5:
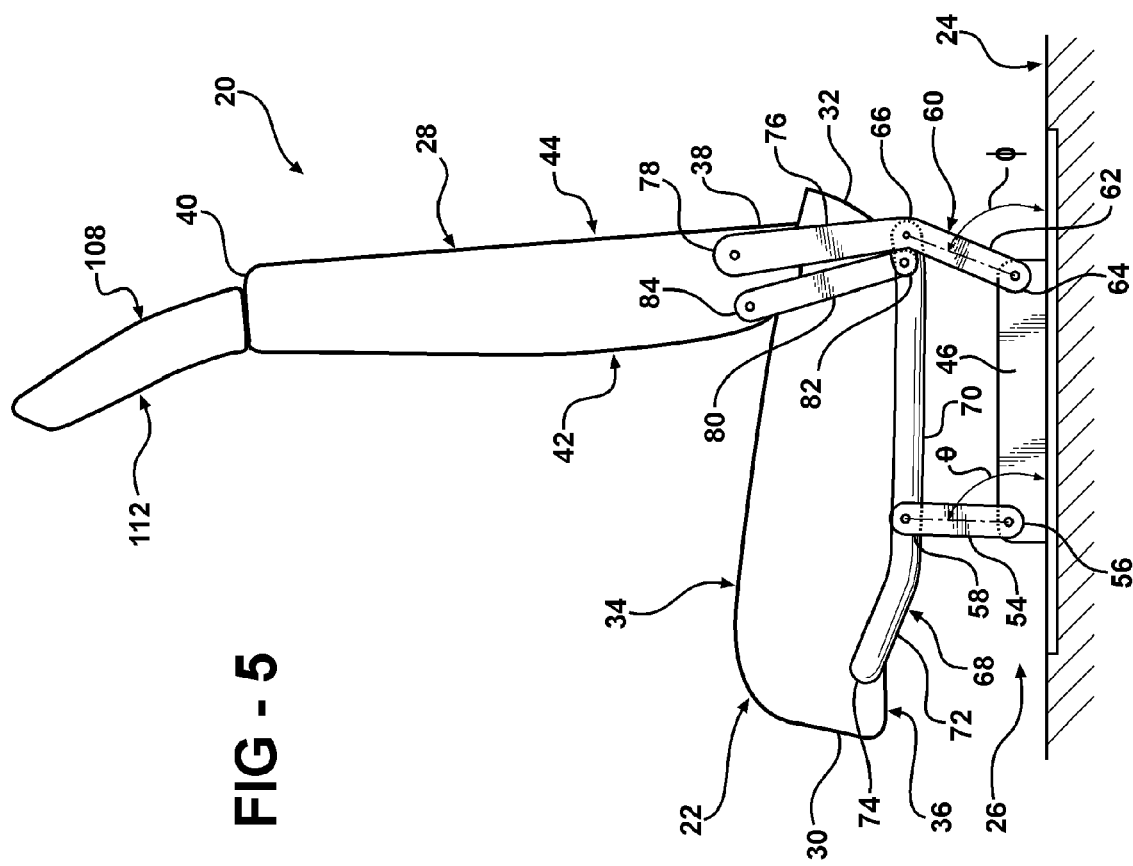
FIG. 5 is a left side elevation view of the seat assembly of FIG. 2, illustrated in a forward tilt position.

Referring now to FIG. 5, a forward tilt orientation of the seat assembly 20 is illustrated for permitting the passenger to enter into the vehicle rearward of the seat assembly 20. In this orientation, the rocker link 68 is shifted forward relative to its orientation in the seating position of the seat assembly 20. In addition, the included angles θ and φ are enlarged as the rocker link 68 is shifted forward. Concurrently, the seat bottom 22 is shifted forward as well. Since the rearward link 60 is shifted forward, the seat back 28 is also shifted forward. Thus, as illustrated in FIG. 5, the linkage assembly 26, seat bottom 22, and seat back 28 collectively shift forward to a forward tilt position for providing access therebehind.

Figure 5A:
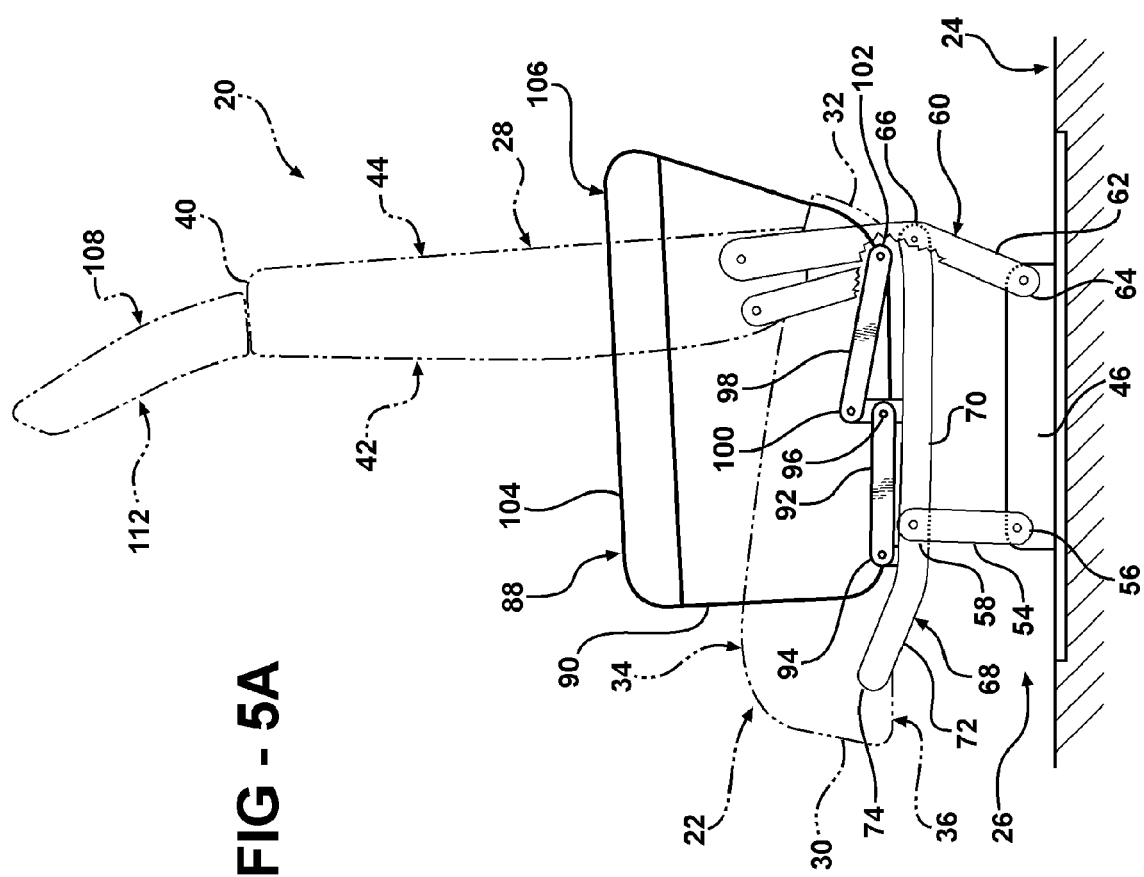
FIG. 5a is a left side elevation view of the seat assembly and the armrest assembly of FIG. 2a, illustrated in a forward tilt position.

Referring now to FIG. 5a, the seat assembly 20 and the armrest assembly 88 are illustrated in the tilt position. Since the armrest assembly 88 is mounted to the linkage assembly 26, the armrest assembly 88 is shifted forward when the seat assembly 20 is shifted to the forward tilt position.

Figure 6:
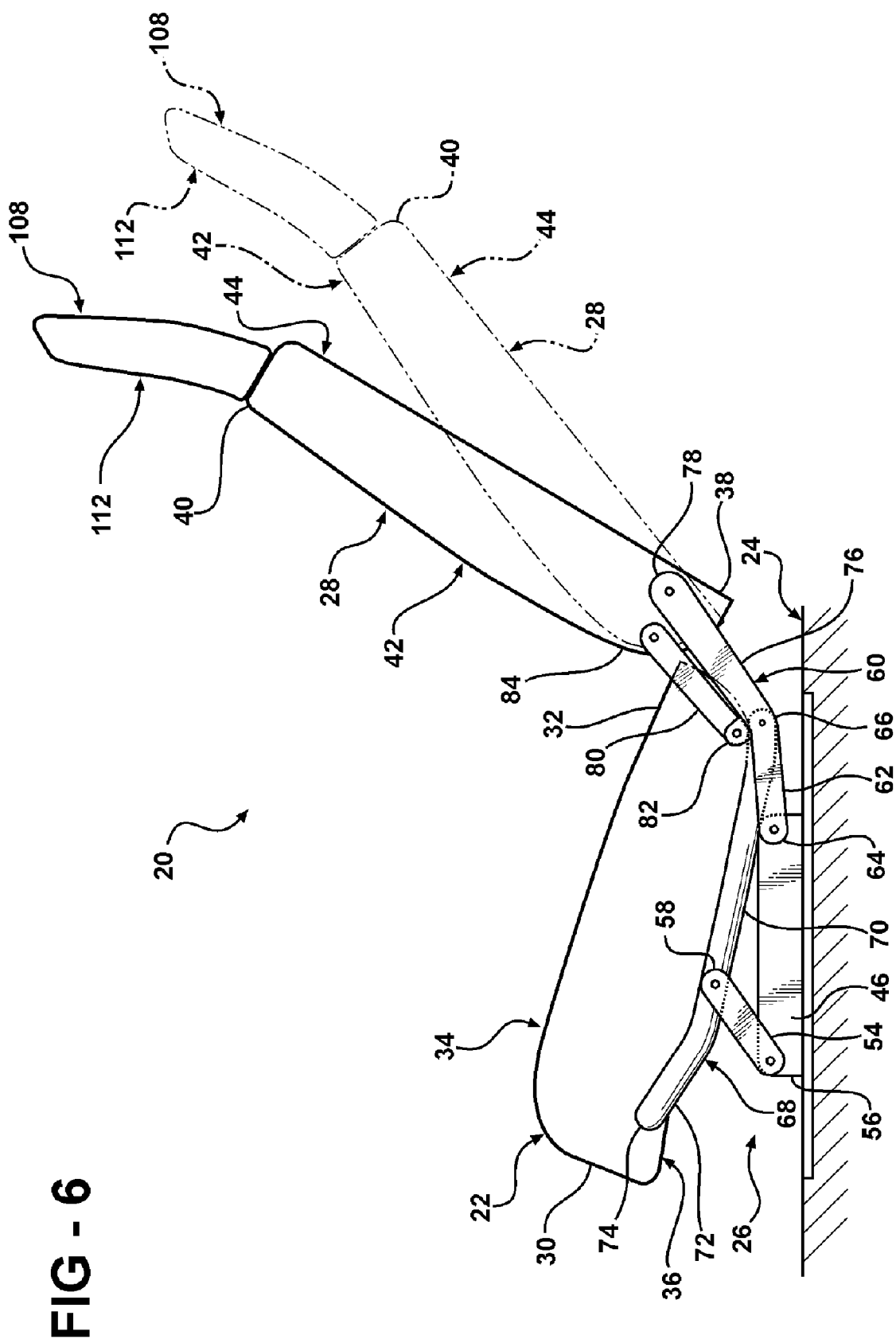
FIG. 6 is a left side elevation view of the seat assembly of FIG. 2, illustrated in a partially reclined position and a fully reclined position.

With reference now to FIG. 6, a reclined orientation of the seat assembly 20 is illustrated. In this orientation, the rocker link 68 is shifted rearward relative to the seating position such that the included angles θ and φ are reduced. Thus, the seat bottom 22 is shifted rearward and the seat bottom rearward portion 32 is lowered toward the floor 24. Additionally, as the rearward link 60 is tilted rearward, the seat back 28 is tilted rearward as well. As mentioned before, the seat back 28 is pivotally adjustable relative to the rocking link 68 and therefore multiple recline positions of the seat back 28 may be obtained as illustrated.

Figure 6A:
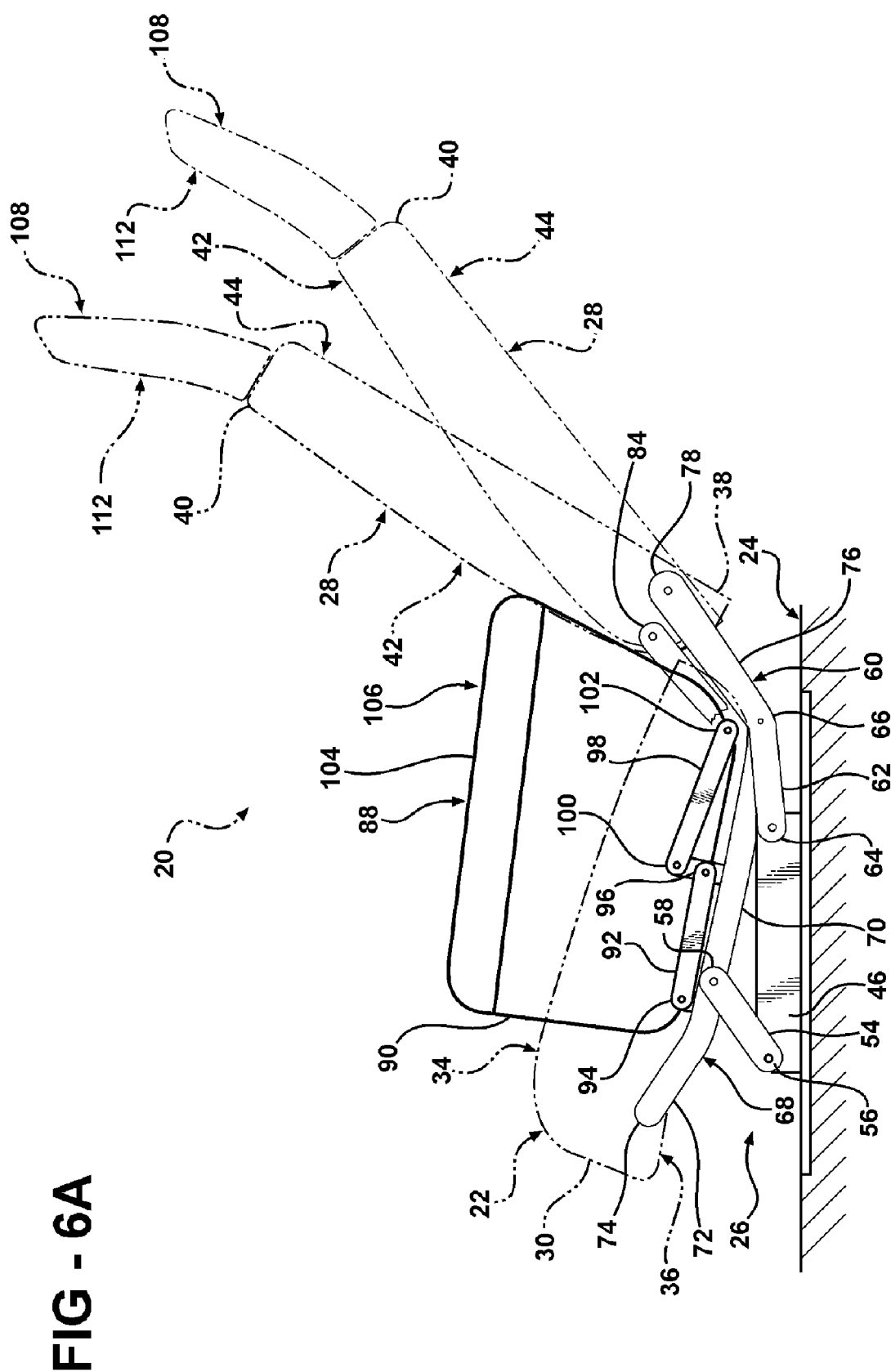
FIG. 6a is a left side elevation view of the seat assembly and the armrest assembly of FIG. 2a, illustrated in a partially reclined position and a fully reclined position.

With reference now to FIG. 6a, the reclined seat assembly 20 is illustrated with the armrest assembly 88. Since the armrest assembly 88 is mounted to the rocker link 68, the armrest assembly 88 obtains a reclined position collectively with the seat assembly 20. Additionally, various passenger selected orientations of the armrest assembly 88 can be obtained by adjustment relative to the rocker link 68.

Figure 7:
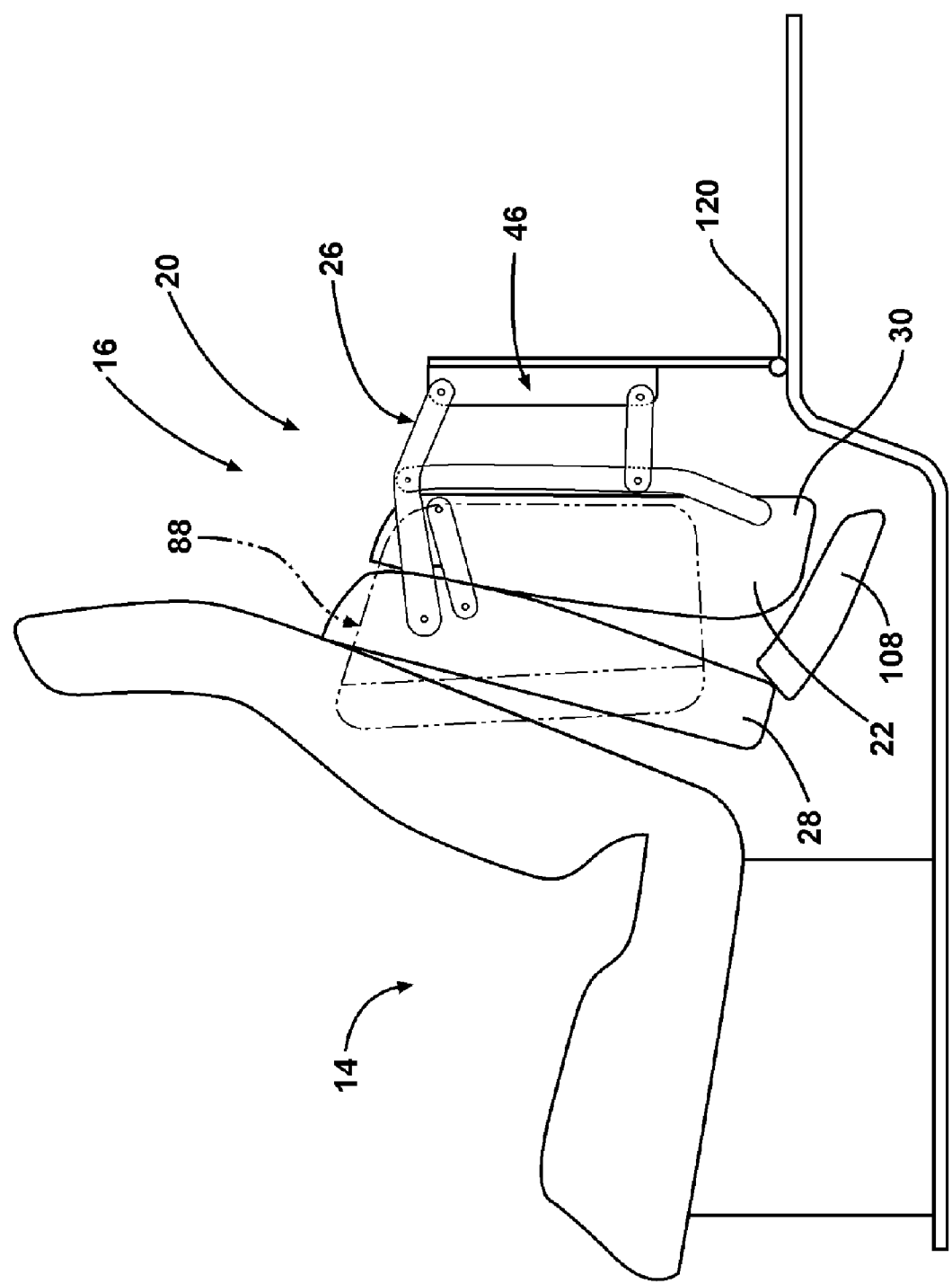
FIG. 7 is a left-side elevation view of the seat assembly and armrest assembly of FIG. 2a, illustrated in a forward flip position.

Referring now to FIG. 7, a forward flip orientation for the seat assembly 20 is illustrated for permitting passenger ingress and egress rearward of the second row 16. Rather than utilizing the linkage assembly 26 for tilting the seat assembly 20 and armrest assembly 88 to a forward position as in FIG. 5, the mounting bracket 46 may be provided with a pivotal connection 120 with the vehicle floor 24. Thus, in order to flip the seat assembly 20 and the armrest assembly 88, the seat back 28 is collapsed against the seat bottom 22. The headrest 108 is pivoted towards the seat bottom forward portion 30 also. Subsequently, the passenger flips the entire seat assembly 20 and armrest assembly 88 about the pivotal connection 120 until the seat back 28 is adjacent to the front row 14. In comparison to the forward tilt position of FIG. 5, the forward flip position in FIG. 7 may provide additional clearance for ingress and egress behind the second row 16 of seat assembly 20.

In summary, a collapsible seat assembly is disclosed having multiple positions including a seating position for receiving a passenger, a forward tilt position for permitting ingress and egress to a subsequent seat assembly, a recline position for passenger comfort, and a collapsed position for cargo transportation. The collapsed orientation is provided by pivoting the seat bottom away from the seat back and subsequently pivoting the seat back adjacent to the seat bottom, thereby exposing load surfaces for defining a load floor. An adjustable armrest assembly is also provided which cooperates with the seat assembly for supporting the arm of the passenger when seating in the seat assembly and for tilting and reclining with the seat assembly. Additionally, the armrest assembly provides an ingress and egress position for providing clearance for the passenger to sit within the seat assembly. Further still, Additionally, the armrest assembly provides a collapsed position wherein the armrest assembly exposes load surfaces which form part of the load floor for receipt of cargo.

While embodiments for carrying out the invention have been described in detail, those familiar with the art to which this invention relates will recognize various alternative designs and embodiments for practicing the invention as defined by the following claims.

What is claimed is:

1. A seat assembly for a motor vehicle having a seating position and a collapsed position, the seat assembly comprising:

a seat bottom operably connected to a floor of the motor vehicle, the seat bottom having a front portion, a rear portion spaced apart from the front portion, and a seating surface provided therebetween facing away from the floor in a seating position for receiving and supporting a seat portion of a passenger thereon, the seat bottom having a load surface provided upon an underside thereof spaced apart from the seating surface and generally facing the floor in the seating position;

a seat back having a lower portion oriented proximate to the seat bottom rear portion in the seating position, an upper portion spaced apart from the lower portion, and a back supporting surface provided therebetween generally facing a forward direction relative to the seat bottom in the seating position for receiving and supporting a back portion of the passenger thereon, the seat back having a load surface formed upon a backside thereof spaced apart from the back supporting surface and generally facing a direction away from the seat back in the seating position; and
a linkage assembly mounted to the vehicle floor and operably connected to the seat back and the seat bottom for supporting and positioning the seat back and the seat bottom relative to the vehicle floor;
wherein the seat bottom is translatable to an orientation such that the seat bottom back portion is spaced apart from the seat back lower portion with the seat bottom front portion disposed therebetween such that the seat bottom load surface is spaced apart and facing away from the floor in a collapsed position of the seat assembly; and
wherein the seat back is translatable to an orientation such the seat back upper portion is adjacent to the seat bottom front portion such that the seat back load surface is spaced apart and facing away from the floor in the collapsed position of the seat assembly, and the seat back load portion and the seat bottom load portion collectively provide a load floor within the vehicle for receiving cargo.

2. The seat assembly of claim 1 wherein the translation of the seat bottom to the collapsed position provides clearance between the seat bottom and the seat back lower portion, and the translation of the seat back to the collapsed position orients the seat back upper portion adjacent to the seat back.

3. The seat assembly of claim 1 wherein the seat bottom load portion and the seat back load portion are aligned generally coplanar in the collapsed position for providing a uniform load floor.

4. The seat assembly of claim 1 further comprising a head rest operably connected to the seat back upper portion, the head rest having a head supporting surface facing a forward direction relative to the seat bottom in the seating position for receiving and supporting a head of the passenger thereon, the head rest being translatable to an orientation wherein the head supporting surface of the head rest is opposed and adjacent to the back supporting surface of the seat back in the collapsed position.

5. The seat assembly of claim 1 wherein the seat bottom and seat back are translatable to a forward orientation for providing clearance for passenger ingress or egress to a seat oriented rearward of the seat assembly.

6. The seat assembly of claim 1 further comprising at least one armrest assembly operably connected to the motor vehicle floor proximate to a lateral side of the seat back, the at least one armrest assembly having an arm supporting surface for receiving and supporting an arm portion of the passenger thereon, the at least one armrest assembly having a load surface formed upon a backside thereof spaced apart from the arm supporting surface and generally facing the floor in the seating position, wherein the at least one armrest assembly is translatable to an orientation such that the armrest assembly load surface is generally coplanar within one of the seat bottom or seat back load surfaces for forming part of the load floor.

7. The seat assembly of claim 6 wherein the at least one armrest assembly is translatable to an orientation such that the arm receiving surface does not extend above the seat bottom seating surface in the seating position of the seat bottom for permitting ingress and egress of the passenger upon the seat assembly.

8. The seat assembly of claim 1 further comprising:
a mounting bracket mounted to the vehicle floor;
a forward link having a first end pivotally connected to the mounting bracket, a second end, and a length therebetween;
a rearward link having a first end pivotally connected to the mounting bracket, a second end, and a length therebetween, the rearward link first end being spaced apart from the forward link first end; and
a rocker link having a forward portion pivotally connected to the forward link second end, a rearward portion pivotally connected to the rearward link second end, and a length therebetween, the rocker link being adapted to support the seat bottom.

9. The seat assembly of claim 8 wherein the rocker link is adapted to support the seat back.

10. The seat assembly of claim 8 wherein the seat bottom is pivotally connected to the rocker link so that the seat bottom may be pivoted from the seating position to the collapsed position.

11. The seat assembly of claim 8 wherein the seat bottom is pivotally connected to the rocker link proximate to the seat bottom front portion so that the seat bottom may be pivoted from the seating position away from the seat back lower portion to the collapsed position thereby providing clearance between the seat back and the seat bottom so that the seat back may be collapsed.

12. The seat assembly of claim 8 wherein one of the forward and rearward links defines an included angle between the length of the respective link and the vehicle floor and the included angle converges as the seat assembly collapses.

13. The seat assembly of claim 8 wherein the rocker link is translatable to a forward orientation for providing a forward position of the seat bottom.

14. The seat assembly of claim 8 wherein the rocker link is translatable to a rearward orientation for providing a reclined position of the seat bottom.

15. The seat assembly of claim 8 further comprising at least one armrest assembly comprising at least one armrest assembly comprising:
a first armrest member operably connected to the rocking link proximate to a lateral side of the seat bottom,
a second armrest member pivotally connected to the first armrest member,
an arm receiving surface provided upon the second armrest member spaced apart and facing away from the vehicle floor in the seating position for receiving and supporting an arm portion of the passenger thereon, and
a load surface provided on the first and second armrest members that is exposed in the collapsed position and oriented facing away from the floor for forming a portion of the load floor.

16. The seat assembly of claim 8 wherein the seat back lower portion is pivotally connected to the rocker link so that the seat back may be pivoted from the seating position to the collapsed position.

17. The seat assembly of claim 16 wherein the seat back pivotal connection permits the seat back to be pivoted to a forward tilt position and a rearward reclined position.

18. An armrest assembly for a collapsible seat assembly of a motor vehicle comprising:
an armrest housing operably connected to a floor of the motor vehicle adjacent to a lateral side of the seat assembly, the armrest housing having a load surface spaced apart and facing away from the vehicle floor; and
an armrest member pivotally connected to the armrest housing, the armrest member having a load surface oriented upon the mounting bracket load surface and an arm receiving surface spaced apart and facing away from the vehicle floor in the seating position for receiving and supporting an arm portion of the passenger thereon;

wherein the armrest member can be pivotally extended from the armrest housing thereby exposing the armrest housing and armrest member load surfaces, which collectively provide a load floor.

19. A seat assembly for a motor vehicle having a seating position and a collapsed position, the seat assembly comprising:

a seat bottom operably connected to a floor of the motor vehicle, the seat bottom having a front portion, a rear portion spaced apart from the front portion, and a seating surface provided therebetween facing away from the floor in a seating position for receiving and supporting a seat portion of a passenger thereon, the seat bottom having a load surface provided upon an underside thereof spaced apart from the seating surface and generally facing the floor in the seating position; and a seat back having a lower portion oriented proximate to the seat bottom rear portion in the seating position, an upper portion spaced apart from the lower portion, and a back supporting surface provided therebetween generally facing a forward direction relative to the seat bottom in the seating position for receiving and supporting a back portion of the passenger thereon, the seat back having a load surface formed upon a backside thereof spaced apart from the back supporting surface and generally facing a direction away from the seat back in the seating position;

wherein the seat bottom is translatable to an orientation such that the seat bottom back portion is spaced apart from the seat back lower portion with the seat bottom front portion disposed therebetween such that the seat bottom load surface is spaced apart and facing away from the floor in a collapsed position of the seat assembly;

wherein the seat back is translatable to an orientation such the seat back upper portion is adjacent to the seat bottom front portion such that the seat back load surface is spaced apart and facing away from the floor in the collapsed position of the seat assembly, and the seat back load portion and the seat bottom load portion collectively provide a load floor within the vehicle for receiving cargo; and wherein the seat bottom and seat back are translatable to a forward orientation for providing clearance for passenger ingress or egress to a seat oriented rearward of the seat assembly.

\* \* \* \* \*